Figure 1:
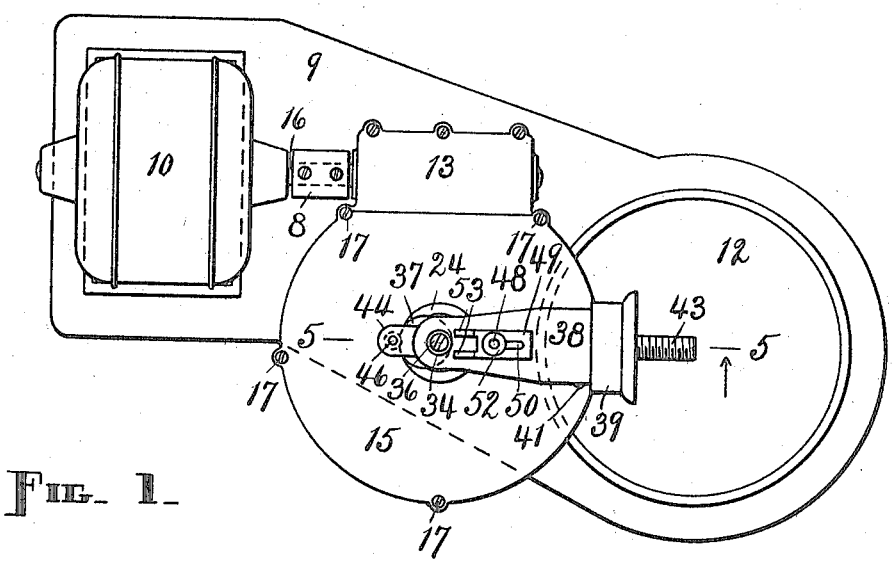

S. N. SENNA.
ATTACHMENT FOR FABRIC TENSILE STRENGTH TESTERS.
APPLICATION FILED DEC. 5, 1914.

1,166,266.

Patented Dec. 28, 1915.
2 SHEETS—SHEET 1.

WITNESSES:
A. C. Fairbanks.
H. G. Cutter.

INVENTOR.
Samuel N. Senna,
BY
Webster & Co.,
ATTORNEYS.

S. N. SENNA.
ATTACHMENT FOR FABRIC TENSILE STRENGTH TESTERS.
APPLICATION FILED DEC. 5, 1914.
1,166,266.
Patented Dec. 28, 1915.
2 SHEETS—SHEET 2.
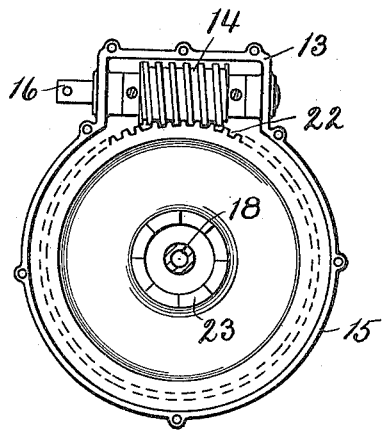
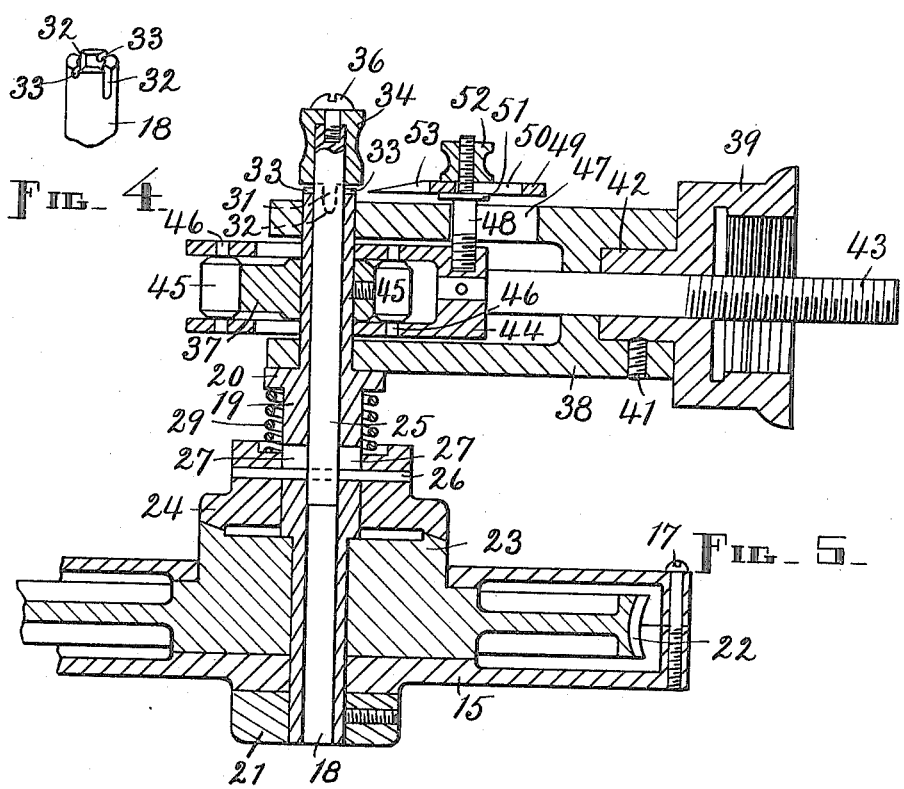

UNITED STATES PATENT OFFICE.

SAMUEL N. SENNA, OF HOLYOKE, MASSACHUSETTS, ASSIGNOR OF ONE-HALF TO CHARLES E. TORRANCE, OF HOLYOKE, MASSACHUSETTS.

ATTACHMENT FOR FABRIC-TENSILE-STRENGTH TESTERS.

1,166,266.  Specification of Letters Patent.  Patented Dec. 28, 1915.

Application filed December 5, 1914. Serial No. 875,717.

*To all whom it may concern:*

Be it known that I, SAMUEL N. SENNA, a citizen of the United States of America, residing at Holyoke, in the county of Hampden and State of Massachusetts, have invented a new and useful Attachment for Fabric-Tensile-Strength Testers, of which the following is a specification.

My invention relates to improvements in means for operating machines designed to test the tensile strength of paper and other fabrics, and more especially for Mullen testers, and consists of certain peculiar motor-driven mechanism, which is adapted to be secured to and operatively connected with a Mullen or other tester, and is provided with suitable controlling means, all as hereinafter set forth.

The present Mullen tester, for measuring the tensile strength or ascertaining the resistance to the bursting point of fabrics, is operated by hand, through the medium of a hand-wheel. This hand-wheel, when turned to advance a plunger, with which said hand-wheel is operatively connected by means of a screw, forces a body of glycerin against a rubber diaphragm, over which the sample being tested is clamped, and finally ruptures such sample. The bursting pressure in pounds per square inch is registered by a gage with which the machine is equipped. In performing such test the speed at which the hand-wheel is turned, and consequently the rapidity with which the test is made, varies. This variation is appreciable in tests made on the same sample, hence the tests made in this manner may and generally are very far from accurate. For example: suppose a person turns the hand-wheel at a certain rate of speed and obtains a test of a certain number of pounds to the square inch, and with the same sample makes another test and turns the hand-wheel at a faster or slower rate of speed than before, a corresponding variation in the strength of the sample will be registered, the difference being much greater than would be caused from any possible variation in the quality of the sample. The variation in speed is a matter of which the operator is entirely unconscious, but that such variation does occur and such a non-constant testing speed does produce a variation in the tests is unquestionably true.

The principal object of my invention, therefore, is to provide for the Mullen tester (or any other similar tester) positive and constant speed operating means, whereby uniform and accurate tests are obtainable with said tester. A constant-speed motor is used in my attachment to drive or operate the tester, and the power is transmitted to said tester through a worm and worm-gear, consequently there can be no variation such as I have referred to above.

A further object of my invention is to produce an attachment for testers, which is comparatively simple in construction and operation, strong and durable, capable of being readily attached to and detached from a tester, and provided with both manually-operated and automatic means of control.

Other objects will appear in the course of the following description.

I attain the objects and secure the advantages of my invention by the mechanism illustrated in the accompanying drawings, in which—

Figure 2:
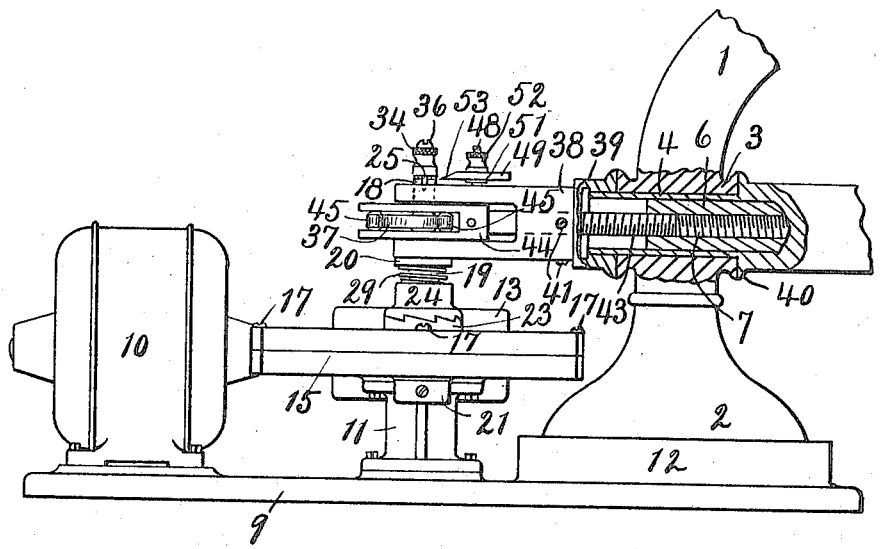

Figure 1 is a top plan of an attachment which embodies a practical form of my invention; Fig. 2, a front elevation of said attachment, the coupling nut being broken away in part, and a portion of a Mullen tester being shown; Fig. 3, a top plan of the worm drive, the vertical members being in cross section; Fig. 4, an isometric view of the upper end portion of the hollow shaft, and, Fig. 5, an enlarged central vertical section, through the major portion of the attachment, taken on lines 5—5, looking in the direction of the associated arrow, in Fig. 1.

Similar numerals designate similar parts throughout the several views.

The attachment is represented, in Fig. 2, as being connected with the tester therein appearing, enough of the latter being shown for the purpose, and portions of the tester frame and plunger being in section for the purpose of disclosing fully the manner of making the connection. The tester members illustrated consist of parts of a frame 1 rising from a base 2 and provided with a yoke 3, a horizontal cylinder 4 which is mounted in said yoke and extends beyond both ends of the same, and a plunger 6 arranged to reciprocate in said cylinder, said plunger having a screw-threaded passage 7 in the axial center thereof. The passage 7 is for the screw of the hand-wheel, to which reference has been made, and which screw is removed when my attachment is used. The end of the cylinder 4 that extends beyond the left-hand end of the yoke 3 is externally screw-threaded, and this screw-threaded part is a necessary element in the old hand-driven operating means. No change in the construction of the Mullen tester is, therefore, required in order to enable my attachment to be applied thereto, as will subsequently be more fully set forth.

Although I have designed this attachment for Mullen testers more particularly, I do not desire or intend to be limited in the application or use of said attachment to said testers, but may apply it to any other make of tester wherein a reciprocating plunger is present. Furthermore, it is to be understood that changes in the shape, size, arrangement, and construction of some or all of the parts of my attachment may be made without departing from the spirit of my invention.

Passing now to the attachment itself and as illustrated in the drawings, it will be observed that I provide for the same a base plate 9 and mount thereon a motor 10 and a support 11. The motor 10 is mounted on the base plate 9 at one end, and the support 11 is mounted thereon between the ends, while a receptacle 12, for the base 2 of the tester, is provided at the end of said plate which is opposite to that upon which said motor is mounted. The support 11 is provided at the top with a housing 13 for a worm 14. A gear case 15 extends forwardly from the housing 13. The worm 14 is secured to the motor shaft 16, which latter in the present case comprises two sections coupled together at 8. The housing 13 and the gear case 15 are made in two sections which are secured together by screws 17 in the usual manner.

An upright hollow shaft 18 extends through the gear case 15, such shaft having an intermediate enlargement 19 with an external flange 20 at the top. Secured on the shaft 18 under the case 15 is a collar 21. Loosely mounted on the shaft 18, within the case 15, is a worm-gear 22. The worm 14 intermeshes with the worm-gear 22 which is in front of the said worm. A clutch member 23 is provided on the worm-gear 22, and mounted on the enlargement 19, above said member and adapted to engage and release the same, is a clutch member 24. The bottom of the case 15 and the hub (including the member 23) of the worm-gear 22 are between the collar 21 and the enlargement 19, so that the shaft 18 can not move endwise. A vertical rod 25 is located partly within the hollow shaft 18 and partly outside and above said shaft, and a transverse pin 26 extends through said rod, a short distance above the lower or inner end thereof, and through the sides of said shaft and of the clutch 24, vertical slots 27—27 being provided in said shaft for said pin. The slots 27 enable the pin 26 to be moved up, by means of the rod 25, with the member 24, the amount of such movement being sufficient to disengage said member from the member 23. A spiral spring 29 is introduced between the member 24 and flange 20, around the enlargement 19, for the purpose of normally retaining said member in engagement with the member 23. When the clutch members are in engagement, the pin 26 is in the lower parts of the slots 27. A thumb-nut or handle 34 is mounted loosely on the top of the rod 25, and depending from said handle is a finger or a pair of fingers which are receivable in oppositely-disposed vertical slots 32—32 in the sides of the shaft 18 at the top, when said rod is in its low position. Such fingers are represented at 31. Horizontal grooves or recesses 33—33 are provided for the fingers 31, in the upper edge of the shaft 18, such recesses usually being in a vertical plane that is at right-angles to the vertical plane of the slots 32. When the rod 25 is drawn up, by means of the handle 34 and against the resiliency of the spring 29, to disengage the clutch member 24 from the clutch member 23, the fingers 31 pass out of the slots 32, and then, by giving said handle a quarter turn in either direction and releasing it, said fingers drop into the recesses 33 and hold said rod securely in its elevated position. Thus provision is made for retaining the clutch member 24 in disengaged position. Before the member 24 can be again engaged with the member 23, the rod 25 must be raised to take the fingers from the recesses 33, and the handle 34 turned to bring said fingers into the vertical plane of the slots 32. The handle 34 with the rod 25 is then released, when the spring 29 acts to force the member 24 into engagement with the member 23. The handle 34 may be secured on the rod 25 by means of a set-screw 36, which passes through the top of said handle and is tapped into the top of said rod. An eccentric or cam 37 is secured on the shaft 18 below the pin 31.

The upper portion of the shaft 18 has bearings in and is supported by the arms of a horizontal yoke 38. The yoke 38 is supported from the tester yoke 3 and cylinder 4 by means of a nut or coupling 39. The coupling 39 is internally screw-threaded to fit the left-hand protruding terminal of the cylinder 4, and said coupling, when screwed tightly into place, bears against the contiguous end of the yoke 3 and draws a shoulder 40 on said cylinder hard against the opposite end of said yoke, as clearly shown in Fig. 2. Set-screws 41 are employed to securely fasten together the yoke 38 and the coupling 39, after the parts have been properly adjusted, said coupling having a tailpiece 42 that fits into the head of said yoke and against which the inner ends of said setscrews bear. Arranged to reciprocate in and through the yoke 38 and the nut 39 is a tailscrew 43. The end of the tail-screw 43, which is between the arms of the yoke 38, is provided with a yoke 44, while the opposite end or terminal of said tail-screw is designed to be screwed into the adjacent end of the passage 7 in the tester plunger 6. Two followers or anti-friction rollers 45 are mounted on vertical spindles 46—46 which have their bearings in the arms of the yoke 44, such rollers being so located that they contact at all times with opposite sides of the eccentric 37. Thus it is seen that, when the shaft 18 is revolved, the eccentric 37, acting through the rollers 45 and their shafts 46, causes the yoke 44 and the tailscrew 43 to reciprocate, and that such motion will be imparted or transmitted by said tail-screw to the plunger 6, provided the former be screwed into the latter, as it is in practice. When the plunger 6 and the tail-piece 43 are connected, they are so adjusted relatively as to insure to said plunger the proper length of stroke.

Mounted on the head of the yoke 44 and rising therefrom, through a slot 47 in the upper arm of the yoke 38, is a post 48. This post carries thereon a lifting finger or lifter 49 for the clutch rod 25. The lifter is slotted at 50 for the passage of the upper terminal of the post 48, and is held in place on a shoulder 51 by means of a thumb-nut 52. The shoulder 51 is a part of the post 48, and the thumb-nut 52 is threaded onto said post above said shoulder and the interposed lifter. The terminal of the lifter 49 which is adjacent to the rod 25 is forked, as represented at 53. The slot 50 permits the lifter 49 to be adjusted longitudinally, when the thumb-nut 52 is loosened.

The lifter 49 is for use as an automatic stop for the mechanism driven by the worm-gear 22, in case it is not desired to throw out the clutch by hand. When not set for action the lifter 49 is retained by the thumb-nut 52 with the left-hand end of the slot 50 against the adjacent part of the post 48, but when said lifter is to be used it is reset, by loosening said thumb-nut, moving said lifter the required distance toward the rod 25, and re-tightening said thumb-nut. This resetting is done while the yoke 44 is a little distance from the end of its outward travel. Now, upon starting the motor, with the clutch in, the yoke 44 with attached parts, including the plunger 6, makes the test stroke and returns, and upon the return stroke forces the lifter fork 53, which is inclined upwardly from the outer ends of the arms or branches, beneath the handle 34, said arms or branches then passing on opposite sides of the rod 25, with the result that said handle and said rod are raised and the clutch member 24 is disengaged from the clutch member 23. The mechanism thus stopped can not be started again until the thumb-nut 52 is loosened and the lifter 49 moved from beneath the handle 34.

The lifter 49 is so located that its bottom plane is approximately on a level with the horizontal plane of the top of the shaft 18, and said lifter is thick enough to raise the parts the distance required to throw out the clutch. Preferably there is a little clearance between the top of the shaft 18 and the underside of the handle 34 when said handle is in its low position, since this facilitates the entrance of the fork 53 beneath said handle.

In practice, the tester is placed in the receiver 12, the tail-screw 43 is screwed the proper distance into the plunger 6, and the yoke 38, in supporting relation to the shaft 18, is securely and accurately fastened to the cylinder 4 and the yoke 3 by means of the coupling 39 and with the aid of the set-screws 41. The attachment is now ready for use.

When a test or a number of tests is to be made by the tester, the motor 10 is started and power therefrom is transmitted through the shaft 16 and the worm 14 to the worm-gear 22, which latter runs loose on the shaft 18. It is assumed that the clutch is out at this time. The handle 34 is next grasped and raised and turned to disengage the fingers 31 from the recesses 32, and then permitted to descend, under the influence of the spring 29, with said fingers in the slots 32, said spring carrying the clutch member 24 down into engagement with the clutch member 23, upon which it bears, and with said member the rod 25, through the medium of the pin 26. The pin 26 thus moves from the top to the bottom of the slots 27. The clutch members 23 and 24 being in engagement, the latter is actuated by the former and carries with it the shaft 18 with the eccentric 37, and incidentally the rod 25 which is connected by the pin 26 with said shaft and said member 24. As often as the eccentric makes a complete revolution the tail-screw 43 is caused to make a full stroke in each direction, through the medium of the rollers 45, the spindles 46, and the yoke 44, consequently the plunger 6 must also make a full stroke in each direction. It is upon the forward stroke of the plunger 6 that a test is made by the tester.

The rotary parts above the worm-gear 22 and consequently the reciprocating parts may be stopped at the end of the return stroke of the latter, if desired, by setting the lifter 49 so that, as the yoke 44 approaches the end of its return stroke, said lifter will pass under the handle 34 and elevate said handle and with it the rod 25, pin 26, and clutch-member 24, against the resiliency of the spring 29, thus disengaging said member from the clutch member 23. The pin 26 rises in the slots 27, when the clutch disengaging operation takes place. The mechanism above the worm-gear 22 can not now be started again until the lifter 49 is readjusted in the manner previously explained.

To stop the aforesaid mechanism by hand, simply grasp and raise the handle 34 with attached parts, which can be done safely because of the very slow rate of speed at which said thumb-nut is revolving. The clutch may be thrown in again at once, or the handle may be turned and the fingers 31 slipped into the recesses 33.

The attachment may be uncoupled from the tester at any time, by loosening the set-screws 41, unscrewing the coupling 39 from the cylinder 4, and unscrewing the tail-screw 43 from the plunger 6.

The slot 47 is long enough to permit the post 48 to travel with the yoke 44 the full distance required.

What I claim as my invention, and desire to secure by Letters Patent, is—

1. The combination, in an attachment for fabric tensile strength testers, with the tester frame and plunger, of a reciprocable member attachable to said plunger, a supporting member, for said first-mentioned member, attachable to said frame, and power-driven means for actuating said first-mentioned member.

2. The combination, in an attachment for fabric tensile strength testers, with the tester frame and plunger, of a reciprocable member attachable to said plunger, a supporting member for said reciprocable member, means to attach said supporting member to and release it from said frame, and power-driven means for actuating said reciprocable member.

3. The combination, in an attachment for fabric tensile strength testers, with the tester cylinder and plunger, of a reciprocable member attachable to said plunger, a supporting member for said reciprocable member, a coupling adapted to connect said supporting member with said cylinder, and power-driven means to actuate said reciprocable member.

4. In an attachment for fabric tensile strength testers, a base plate provided with receiving means for a tester, a motor mounted on said plate, a housing and gear case also mounted on said plate, power-transmitting mechanism, for a tester held by said receiving means, supported by said tester, and driving mechanism for said power-transmitting mechanism, said driving mechanism being in said gear case and housing and connected with said motor.

5. An attachment, for fabric tensile strength testers, comprising a member provided with a part that is capable of being attached to a tester, a member mounted to reciprocate in the first and adapted to be attached to a tester plunger, and power-driven means to actuate said member which is attachable to said plunger.

6. An attachment, for fabric tensile strength testers, comprising a member attachable to a tester, a member mounted to reciprocate in the first and attachable to a tester plunger, driving mechanism for said member which is attachable to said plunger, power driving means for said mechanism, and means to stop said mechanism approximately at the end of each return stroke of said last-mentioned member.

7. An attachment, for fabric tensile strength testers, comprising a member attachable to a tester, a member mounted to reciprocate in the first and attachable to a tester plunger, driving mechanism for said member which is attachable to said plunger, power driving means for said mechanism, and clutch mechanism between said power driving means and said driving mechanism.

8. An attachment, for fabric tensile strength testers, comprising a member attachable to a tester, a member mounted to reciprocate in the first and attachable to a tester plunger, driving mechanism for said member which is attachable to said plunger, power driving means for said mechanism, clutch mechanism between said power driving means and said driving mechanism, and hand-operated means for said clutch mechanism.

9. An attachment, for fabric tensile strength testers, comprising a member attachable to a tester, a member mounted to reciprocate in the first and attachable to a tester plunger, driving mechanism for said member which is attachable to said plunger, power driving means for said mechanism, clutch mechanism between said power driving means and said driving mechanism, and automatically operating means for said clutch mechanism, whereby the latter is caused to act to stop said driving means approximately at the end of the return stroke of said last-mentioned member.

10. An attachment, for fabric tensile strength testers, comprising a member attachable to a tester, a member mounted to reciprocate in the first-mentioned member and attachable to a tester plunger, driving mechanism for said member which is attachable to said plunger, power driving means for said mechanism, clutch mechanism between said power driving means and said driving mechanism, hand-operated means for said clutch mechanism, and automatically-operated means for said clutch mechanism, said automatically-operated means being adapted to act to stop said driving means approximately at the end of the return stroke of said last-mentioned member.

11. The combination, in an attachment for fabric tensile strength testers, with a revoluble shaft, a power-drvien member loose on said shaft, supporting means for said member and shaft, clutch means to couple said member to and uncouple it from said shaft, and a cam secured on said shaft, of a supporting member attachable to a tester, said shaft having a bearing in said supporting member, and a reciprocable member mounted in said supporting member, and provided with a cam-engaging part, said reciprocable member being attachable to a tester plunger.

12. The combination, in an attachment for fabric tensile strength testers, with a revoluble shaft, a power-drvien member loose on said shaft, said member having a clutch member, supporting means for said power-driven member and shaft, a spring-pressed clutch member on said shaft in operative relation to said first-mentioned clutch member, means to connect said second clutch member rotatably with said shaft, and a cam secured on said shaft, of a supporting member attachable to a tester, said shaft having a bearing in said supporting member, and a reciprocable member mounted in said supporting member, and provided with a cam-engaging part, said reciprocable member being attachable to a tester plunger.

13. The combination, in an attachment for fabric tensile strength testers, with a revoluble shaft, a power-driven member loose on said shaft, supporting means for said member and shaft, clutch means to couple said member to and uncouple it from said shaft, and a cam secured on said shaft, of a yoke, said shaft having bearings in said yoke, a coupling to attach said yoke to a tester, a tail-screw attachable to a tester plunger, said tail-screw having a yoke and being reciprocable in said first-mentioned yoke, and rollers carried by said tail-screw yoke in engagement with oppositely-disposed points of said cam.

14. The combination, in an attachment for fabric tensile strength testers, with a revoluble hollow slotted shaft, a power-driven member loose on said shaft, said member having a clutch member, supporting means for said power-driven member and shaft, a spring-pressed clutch member on said shaft in operative relation to said first-mentioned clutch member, a rod in said shaft and projecting therefrom at the top, a pin extending from said rod through the slots in said shaft into said second clutch member, and a cam secured on said shaft, of a supporting member attachable to a tester, said shaft having a bearing in said supporting member, and a reciprocable member mounted in said supporting member, and provided with a cam-engaging part, said reciprocable member being attached to a tester plunger.

15. The combination, in an attachment for fabric tensile strength testers, with a revoluble shaft, a power-driven member loose on said shaft, said member having a clutch member, supporting means for said power-driven member and shaft, a spring-pressed clutch member on said shaft in operative relation to said first-mentioned clutch member, means to connect said clutch member with said shaft, means to actuate said second clutch member out of engagement with said first clutch member, means to retain said second member in disengaged position, and a cam secured on said shaft, of a supporting member attachable to a tester, said shaft having a bearing in said supporting member, and a reciprocable member mounted in said supporting member, and provided with a cam-engaging part, said reciprocable member being attachable to a tester plunger.

16. The combination, in an attachment for fabric tensile strength testers, with a revoluble hollow slotted shaft, a power-driven member loose on said shaft, said member having a clutch member, supporting means for said power-driven member and shaft, a spring-pressed clutch member on said shaft in operative relation to said first-mentioned clutch member, a rod in said shaft and projecting therefrom at the top, a pin extending from said rod through certain of the slots in said shaft into said second clutch member, a handle loosely mounted on said rod and provided with a finger which is adapted to enter a slotted part of said shaft, when said rod is down, and to rest on top of said shaft, when said rod is elevated and said handle is turned, and a cam secured on said shaft, of a supporting member attachable to a tester, said shaft having a bearing in said supporting member, and a reciprocable member mounted in said supporting member, and provided with a cam-engaging part, said reciprocable member being attachable to a tester plunger.

17. The combination, in an attachment for fabric tensile strength testers, with a revoluble hollow shaft, a power-driven member loose on said shaft, supporting means for said member and shaft, clutch means adapted to couple said member to and uncouple it from said shaft, such means consisting in part of a rod in said shaft and projecting therefrom at the top, a projecting member on the protruding portion of said rod, and a cam secured on said shaft, of a supporting member attachable to a tester, said shaft having a bearing in said supporting member, a reciprocable member mounted in said supporting member and provided with a cam-engaging part, a post carried by said reciprocable member, a lifter, and means to mount said lifter on said post in operative relation to said projecting member on said rod.

18. In an attachment for fabric tensile strength testers, a base plate, a support mounted on said plate, a housing and gear case mounted on said support, power-transmitting mechanism, for a tester mounted on said plate supported by said case, and driving gears in said housing and case, for said power-transmitting mechanism.

19. The combination, in an attachment for fabric tensile strength testers, of vertical power-transmitting means, horizontal driven means attachable to a tester plunger, a connection between said vertical means and said horizontal driven means, and automatic means to stop said power-transmitting means approximately at the end of each cycle thereof.

20. The combination, in an attachment for fabric tensile strength testers, of vertical power-transmitting means, horizontal driven means attachable to a tester plunger, a connection between said vertical means and said horizontal driven means, hand-operated starting means for said power-transmitting means, and automatic stopping means therefor, said stopping means acting approximately at the end of each cycle of said power-transmitting means.

SAMUEL N. SENNA.

Witnesses:
F. A. CUTTER,
A. C. FAIRBANKS.

Copies of this patent may be obtained for five cents each, by addressing the "Commissioner of Patents, Washington, D. C."